US012237629B2

(12) United States Patent

Liu et al.

(10) Patent No.: US 12,237,629 B2
(45) Date of Patent: Feb. 25, 2025

(54) BUS BAR CONNECTOR

(71) Applicants: Tyco Electronics (Shanghai) Co. Ltd., Shanghai (CN); TE Connectivity Services GmbH, Schaffhausen (CH)

(72) Inventors: Jiaoyong (Mac) Liu, Shanghai (CN); Hongqiang (Sean) Han, Shanghai (CN); Jie (Roger) Luo, Shunde (CN); Brian Patrick Costello, Athens, GA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 357 days.

(21) Appl. No.: 17/900,110

(22) Filed: Aug. 31, 2022

(65) Prior Publication Data

US 2023/0064235 A1 Mar. 2, 2023

(30) Foreign Application Priority Data

Aug. 31, 2021 (CN) ........................ 202111019028.6

(51) Int. Cl.

| | |
|---|---|
| ***H01R 25/14*** | (2006.01) |
| ***H01R 4/28*** | (2006.01) |
| ***H01R 24/60*** | (2011.01) |

(52) U.S. Cl.

CPC ............ *H01R 25/145* (2013.01); *H01R 4/28* (2013.01); *H01R 24/60* (2013.01)

(58) Field of Classification Search

CPC ......... H01R 25/145; H01R 4/28; H01R 24/60
USPC ................................................ 439/212, 213
See application file for complete search history.

(56) References Cited

U.S. PATENT DOCUMENTS

| | | | | |
|---|---|---|---|---|
| 4,845,589 A * | 7/1989 | Weidler | H02B 1/21 | 439/247 |
| 6,508,656 B2 * | 1/2003 | Chevassus-More | H02B 11/04 | 439/721 |
| 9,431,783 B1 * | 8/2016 | Costello | H01R 12/7088 | |
| 2019/0089093 A1 * | 3/2019 | Liu | H01R 12/7088 | |
| 2021/0328376 A1 * | 10/2021 | Liu | H01R 4/28 | |

* cited by examiner

*Primary Examiner* — Phuong K Dinh
(74) *Attorney, Agent, or Firm* — Barley Snyder

(57) ABSTRACT

A connector for plugging into a bus bar comprises a housing with a first side wall, a second side wall, and a connecting channel between the first side wall and the second side wall. A plurality of power terminals each having an electrical connection part are provided inside the connecting channel and are adapted to electrically connect with the bus bar. A plurality of grounding terminals are each disposed on the first side wall and the second side wall outside the connecting channel respectively. Each of the grounding terminals have an elastic first finger. An auxiliary support member is provided and supports the first finger.

20 Claims, 3 Drawing Sheets

BUS BAR CONNECTOR

CROSS-REFERENCE TO RELATED APPLICATIONS

This application claims the priority benefit of Chinese Patent Application No. 202111019028.6 filed on Aug. 31, 2021 in the China National Intellectual Property Administration, the whole disclosure of which is incorporated herein by reference.

FIELD OF THE INVENTION

The present disclosure relates to a connector, and more specifically, to a connector for plugging into a bus bar and an electrical device comprising the same.

BACKGROUND

A connector used in a high current density application needs to be grounded so as to ensure safe operation. However, in the prior art, it is a typical arrangement that power terminals and grounding terminals of the connector are arranged in a row, which may risk short-circuiting of the power terminals of the connector in certain conditions (such as relatively high humidity, failure or error in assembly, etc.) risk. And when assembling various connecting components, due to an error in aligning the various connecting components or manufacturing tolerances of the various connecting components themselves, then it may be too difficult for the grounding terminals to provide sufficient contact forces upon being inserted into the bus bar to contact reliably with a respective one of ground wires in the bus bar, eventually resulting in a failure in grounding the grounding terminals, and in turn an electric failure or a potential hazard of such electric failure of an electrical equipment comprising the connector.

Accordingly, improved connector designs are desired.

SUMMARY

According to one embodiment of the present disclosure, a connector for plugging into a bus bar comprises a housing with a first side wall, a second side wall, and a connecting channel between the first side wall and the second side wall. A plurality of power terminals each having an electrical connection part are provided inside the connecting channel and are adapted to electrically connect with the bus bar. A plurality of grounding terminals are each disposed on the first side wall and the second side wall outside the connecting channel respectively. Each of the grounding terminals have an elastic first finger. An auxiliary support member is provided and supports the first finger.

BRIEF DESCRIPTION OF THE DRAWINGS

The invention will now be described by way of example with reference to the accompanying Figures, of which.

DETAILED DESCRIPTION OF THE EMBODIMENTS

Figure 1:
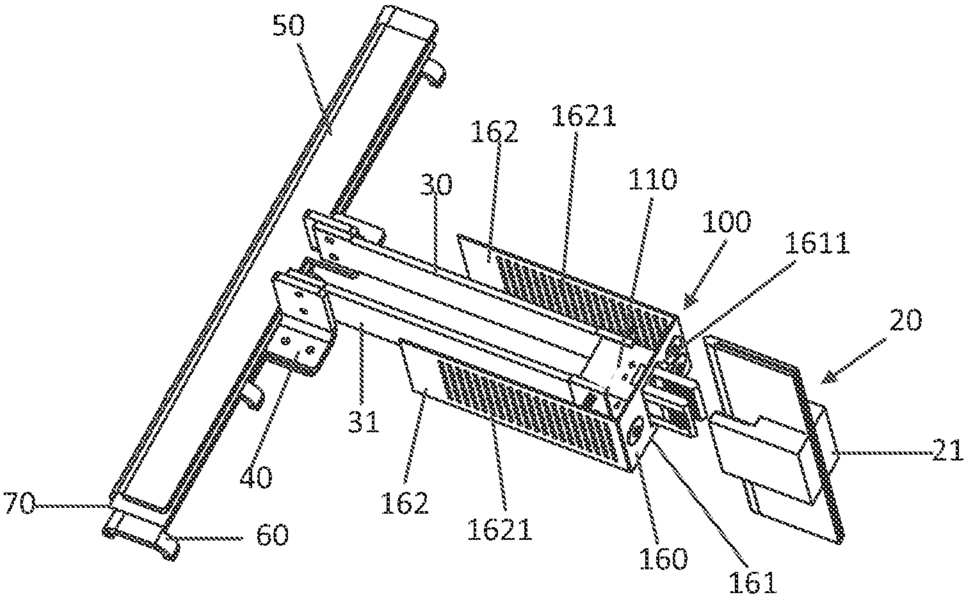
FIG. 1 is a perspective view showing an application of a connector for electrically connecting a bus bar to a cable according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a schematic diagram of electrically connecting a bus bar 20 to cables 30, 31 using a connector 100 according to an embodiment of the present invention. One end of the connector 100 (i.e., a connecting channel 120 described below) is inserted into an interface 21 of the bus bar 20 so as to be electrically connected to the bus bar 20, and an opposite end of the connector 100 is connected to respective one ends of the two cables 30, 31. As shown in FIG. 1, a housing 110 of the connector 100 is marked with "+" and "−" signs, and the cable 30 connected with a side of the connector 100 which is adjacent to the "+" sign is a positive cable 30, while the cable 31 connected with another side of the connector 100 which is adjacent to the "−" sign is a negative cable 31. Respective opposite ends of the two cables 30, 31 are respectively electrically connected to a positive electrode plate 50 and a negative electrode plate 60 through respective connection terminals 40, the positive electrode plate 50 and the negative electrode plate 60 are connected to other parts (not shown) of an electrical equipment, and are separated apart from each other by an insulating plate 70 located therebetween. As such, a relatively large current conducted from the bus bar 20 is conducted to other parts of the electrical equipment through the connector 100, the cables 30, 31 and the electrode plates 50, 60, so as to form a closed circuit.

Hereinafter, the structure of the connector 100 according to the embodiment of the present invention will be described in detail with reference to FIGS. 2 to 5.

The connector 100 comprises a housing 110, power terminals 130, two grounding terminals 140, an auxiliary support member 150 and a mating plate 160. The housing 110 has a first side wall 121, a second side wall 122, and a connecting channel 120 between the first side wall 121 and the second side wall 122, and the connecting channel 120 extends longitudinally so as to be plugged into the bus bar 20. The housing 110 also has two shoulders 111, which are located on two opposite sides of the connecting channel 120 and extend from the first side wall 121 and the second side wall 122 in respective extending directions away from the connecting channel 120 respectively. In this embodiment, one of the shoulders 111 extends substantially perpendicular to a respective one of the first side wall 121 and the second side wall 122, and the other one of the shoulders 111 extends substantially perpendicular to the other one of the first side wall 121 and the second side wall 122. The mating plate 160 is generally made of copper. The two shoulders 111 are provided with threaded holes 112, respectively, so as to fix a main body 161 of the mating plate 160 to the two shoulders 111 and the main body 161 is provided with an opening 1611 through which the connecting channel 120 passes, so as to facilitate assembling the mating plate 160 onto the connector 100. Two wings 162 of the mating plate 160 extend longitudinally from the main body 161 in respective lengthwise directions away from the connecting channel 120, respectively, so as to connect to a ground wire (not shown) in the electrical equipment, and the two wings 162 are provided with a plurality of perforations 1621 for heat dissipation and are located outside the two cables 30, 31 respectively (see FIG. 1), so that heat generated when a relatively large current passes through the two cables 30, 31 dissipates through the plurality of perforations 1621 in the two wings 162.

In this embodiment, the connector 100 comprises two grounding terminals 140 located outside the connecting channel 120, respectively. Each of the grounding terminals 140 is in a form of a substantially "L" shape, and a part of each of the grounding terminal 140 (i.e., first fingers 141 described below) may be disposed on the first side wall 121 or the second side wall 122 of the connecting channel 120, and the other part (i.e., fixing fingers 142 described below) of each of the grounding terminal 140 may be provided on each of the two shoulders 111.

Figure 2:
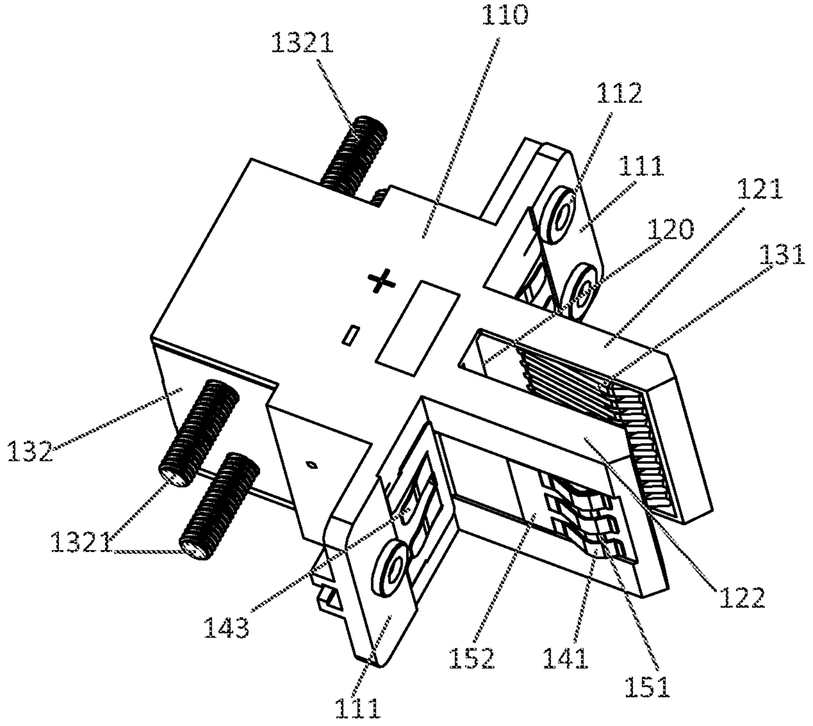
FIG. 2 is a perspective view of the connector in FIG. 1, with a mating plate of the connector being removed for clarity.
Figure 3:
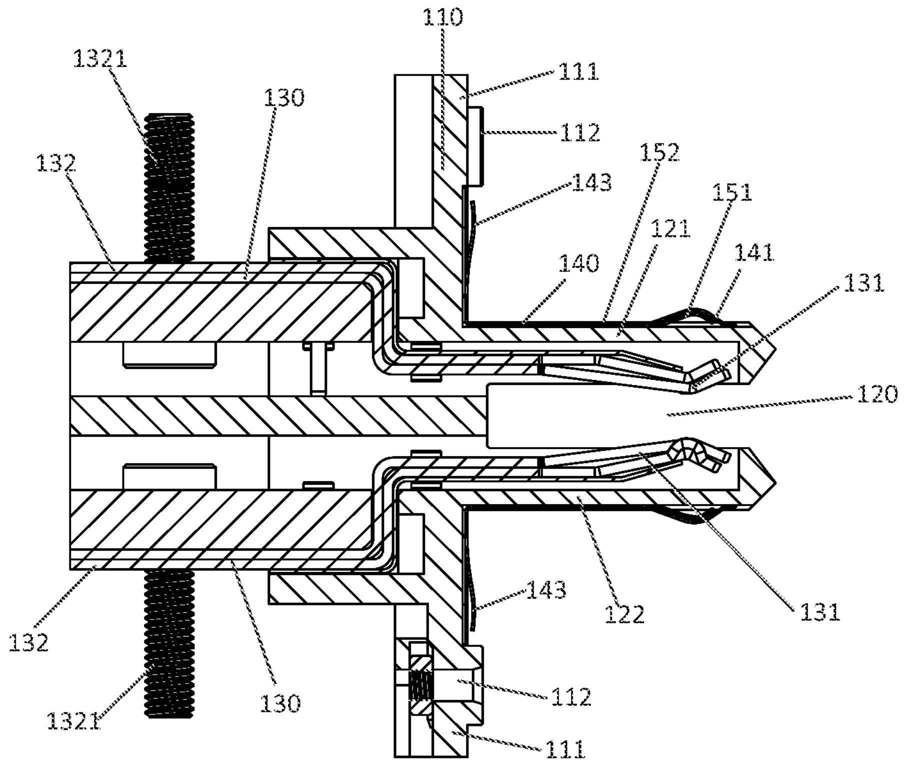
FIG. 3 is a cross-sectional view of the connector in FIG. 2.

In this embodiment, the connector 100 comprises two power terminals 130 electrically connected to the positive cable 30 and the negative cable 31 respectively, and each of the power terminals 130 has an electrical connecting component 131 disposed inside the connecting channel 120. The electrical connecting component 131 may be used for electrically connecting with the bus bar 20 to be plugged, and two electrical connecting components 131 are arranged to be spaced apart from each other on the first side wall 121 and the second side wall 122 of the connecting channel 120 respectively, as shown in FIGS. 2 to 3.

Therefore, the power terminals 130 are spaced apart from the grounding terminals 140 by the connecting channel 120, which greatly reduces or even eliminates a risk of short circuit of the power terminals 130 in some cases, and thus improves safety performance of the connector 100 and the electrical equipment comprising the connector 100.

As shown in FIGS. 2 to 6, each of the grounding terminals 140 located outside the connecting channel 120 has at least one first finger 141 which is elastic, which protrudes away from the connecting channel 120 and is bent so as to reliably abut in the bus bar 20 when the connecting channel 120 is plugged into the bus bar 20, which also facilitates plugging the connector 100 detachably into the bus bar 20 in a reliable and stable manner. In order to enhance such reliable and stable insertion, the auxiliary support member 150 is used to cooperate with the at least one first finger 141 so as to provide an auxiliary support to the at least one first finger 141, and the auxiliary support member 150 will be described in detail below. When the connecting channel 120 passes through the opening 1611 of the mating plate 160, due to manufacturing tolerance or assembly error of the mating plate 160 or the housing 110 of the connector 100, the connecting channel 120 may be offset relative to the opening 1611 of the mating plate 160. However, due to this structural arrangement, the offset will not affect a reliable abutment of the at least one first finger 141 in the bus bar 20, thus avoiding the problem of insufficient elastic force provided by the grounding terminals 140 in the existence of the offset. Although three first fingers 141 are specifically shown here, this is not limitative, and specific number of the first fingers 141 may be set as appropriate.

As described above, in order to enhance respective elastic forces provided by the at least one first finger 141, then, as shown in FIGS. 2 to 5, the connector 100 further comprises the auxiliary support member 150, which comprises a first auxiliary arm 151, a fixing part 152, and a connecting component 153. The first auxiliary arm 151 has substantially the same curvature as the first fingers 141, extends transversely to the first fingers 141 and is located between the first fingers 141 and one of the first side wall 121 and the second side wall 122. Therefore, when the first fingers 141 are inserted into the bus bar 20, the first auxiliary arm 151 prevents the first fingers 141 from being compressed and deformed into respective shapes having a smaller curvature, so as to ensure the curvature of the first fingers 141 and a reliable elastic force provided by the first fingers 141. The auxiliary support member 150 is formed independently from the grounding terminal 140. The grounding terminals 140 are generally made of copper. The auxiliary support member 150 is made of stainless steel, which effectively prevents the first auxiliary arm 151 from losing elasticity due to stress relief at relatively high temperatures.

Figure 4:
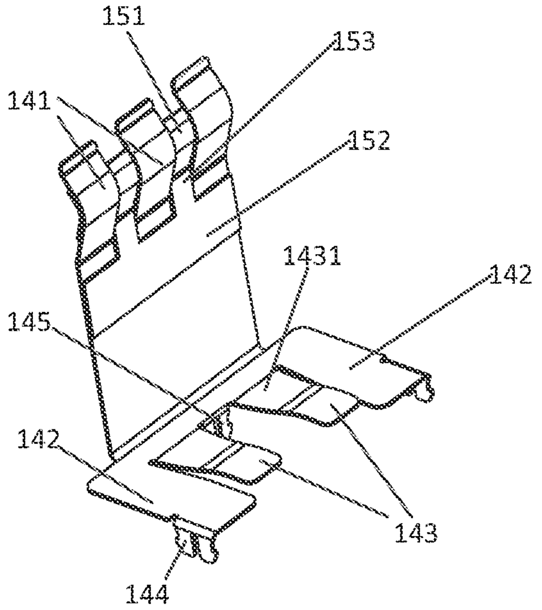
FIG. 4 is a perspective view of an embodiment of a grounding terminal installed on the connector in FIG. 2.
Figure 5:
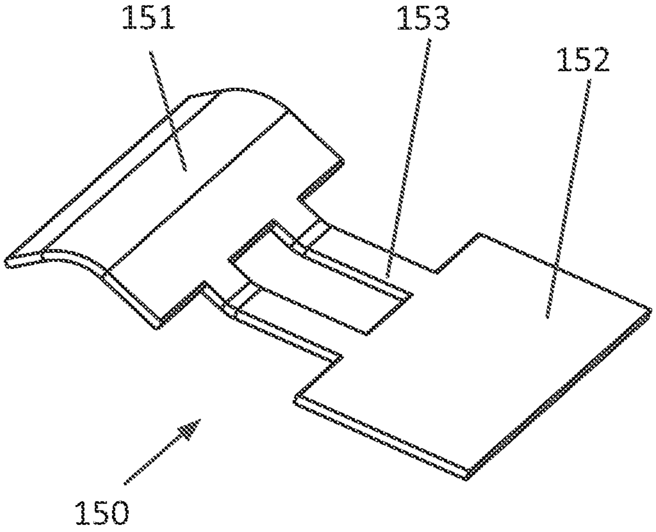
FIG. 5 is a perspective view of an auxiliary support member installed on the grounding terminal in FIG. 4.

As shown in FIGS. 4 to 5, the fixing part 152 is fixed onto respective grounding terminal 140 on a side of the grounding terminal 140 opposite to (i.e., facing away from) the connecting channel 120 by a suitable method (for example, welding, bonding, etc.), and each of two connecting components 153 extends from the fixing part 152 through a gap between two adjacent first fingers 141 to the first auxiliary arm 151.

As described above, in order to facilitate fixing the grounding terminals 140 to respective shoulders 111, each of the grounding terminals 140 further has two fixing fingers 142, and each of the two fixing fingers 142 is fixed, by respective first plug-in parts 144 protruding therefrom, to a respective shoulder 111. In order to enhance the abutment between the grounding terminal 140 and the mating plate 160 and in turn improving a grounding performance of the grounding terminal 140, each of the grounding terminals 140 also has two second fingers 143 which are elastic, which are located between the two fixing fingers 142 and extend obliquely from a plane defined by the two fixing fingers 142, so that when the two fixing fingers 142 and the two second fingers 143 are sandwiched between the respective shoulder 111 and the main body 161 of the mating plate 160, the second fingers 143 reliably abuts against the mating plate 160 so as to ensure reliable contact between each of the grounding terminals 140 and the mating plate 160. In order to further facilitate fixing each of the grounding terminals 140 to the respective shoulder 111, a second plug-in part 145 is arranged between respective roots 1431 of the two second fingers 143 and protrudes from between the roots 1431, for being plugged into the respective shoulder 111. In the embodiment of the present application, both the first plug-in parts 144 and the second plug-in part 145 are all set into the shape of a tuning fork, however, they may also be set into other suitable shapes according to actual needs. In the present application, the specific number of the first plug-in parts 144 and the second plug-in part 145 may not be restrictive.

By this fixing method of the grounding terminals 140 and the substantially "L"-shaped structure of the grounding terminals 140, each of the grounding terminals 140 is basically abutted against the respective shoulder 111 of the housing 110 of the connector 100 and a respective surface of the connecting channel 120 (see FIGS. 2 and 3), facilitating installation of the grounding terminals 140 onto the connector 100 in a limited space, saving installation space for the grounding terminals 140, and providing convenience for installation of other components.

Figure 6:
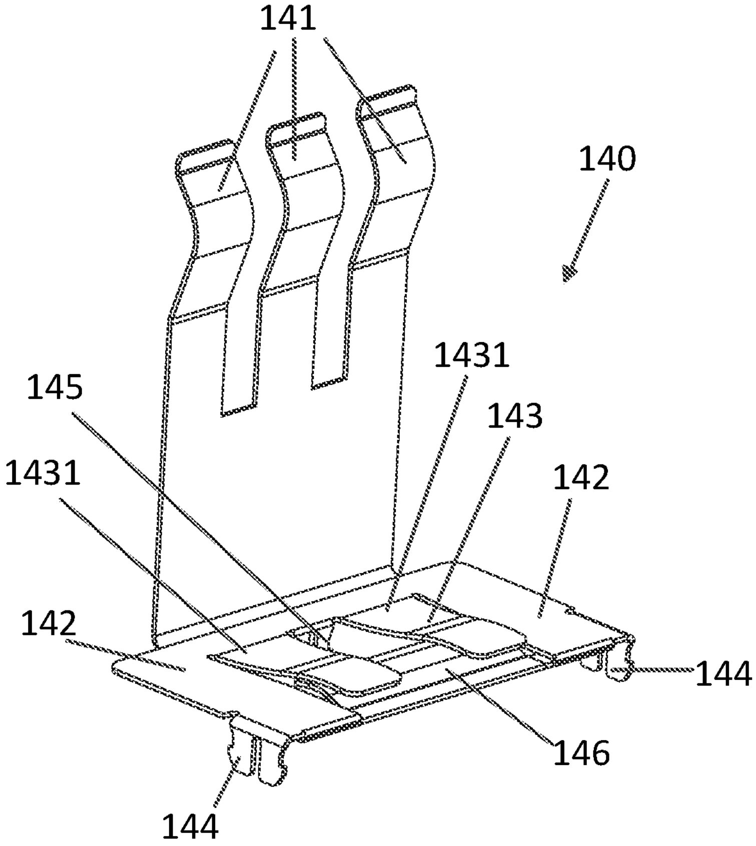
FIG. 6 is a perspective view of another embodiment of the grounding terminal according to the present invention, with the auxiliary support member being removed for clarity.

FIG. 6 shows another embodiment of the grounding terminal 140, and for the sake of clarity, the auxiliary support member 150 is omitted in this embodiment. The only difference between the embodiment shown in FIG. 6 and the embodiment shown in FIG. 4 lies in that the grounding terminal 140 in FIG. 6 is also provided with a second auxiliary arm 146, which is connected between the two fixing fingers 142 and is located between the respective shoulder 111 and the second fingers 143 and projects curvedly towards the second fingers 143. Free ends of the second auxiliary arm 146 may be oriented toward roots 1431 of the second fingers 143. The second auxiliary arm 146 is configured to prevent the second fingers 143 from being pressed against the respective shoulder 111, which further ensures that the second fingers 143 may be reliably abut against the main body 161 of the mating plate 160.

As shown in FIGS. 1 to 3, at the opposite ends of the connector 100, portions 132 of the two power terminals 130 exposed outside the housing 110 are fixed to respective cables 30, 31 by bolts 1321 respectively, and thus are in direct electrical contact with the cables 30, 31, respectively.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector for plugging into a bus bar, comprising:
- a housing with a first side wall, a second side wall, and a connecting channel between the first side wall and the second side wall;
- a plurality of power terminals each having an electrical connection part provided inside the connecting channel and configured for electrically connecting with the bus bar;
- a plurality of grounding terminals each disposed on the first side wall and the second side wall outside the connecting channel respectively, each of the grounding terminals having a first finger which is elastic; and
- an auxiliary support member supporting the first finger.

2. The connector according to claim 1, wherein the auxiliary support member comprises:
- a first auxiliary arm located between the first finger and one of the first side wall or the second side wall;
- a fixing part fixed to a respective one of the grounding terminals on a side thereof opposite to the connecting channel; and
- a connecting component extending from the fixing part through a gap between the first fingers to the first auxiliary arm.

3. The connector according to claim 2, wherein the housing further includes two shoulders located on opposite sides of the connecting channel, respectively, one of the shoulders extending from the first side wall away from the connecting channel, and the other one of the shoulders extending from the second side wall away from the connecting channel.

4. The connector according to claim 3, wherein each of the grounding terminals further includes:
- two fixing fingers fixed to a respective one of the shoulders; and
- an elastic second finger located between the two fixing fingers and extending obliquely outside of a plane defined by the two fixing fingers.

5. The connector according to claim 4, wherein each of the grounding terminals further includes:
- two first plug-in parts, each of which protrudes from a respective one of the fixing fingers for plugging into the respective shoulder; and
- a second plug-in part located between and protruding from between roots of two second fingers for plugging into the corresponding shoulder.

6. The connector according to claim 5, wherein each of the grounding terminals further comprises a second auxiliary arm connected between the two fixing fingers and located between the respective shoulder and the two second fingers, the second auxiliary arm projecting curvedly towards the two second fingers.

7. The connector according to claim 6, further comprising a mating plate, including:
- a main body fixed to the two shoulders, the two fixing fingers and the two second fingers of each of the grounding terminals are clamped between the shoulders and the main body; and
- two wings extending longitudinally from the main body in respective directions away from the connecting channel and provided with a plurality of perforations.

8. The connector according to claim 7, wherein the main body defines an opening through which the connecting channel passes.

9. The connector according to claim 8, further comprising two power terminals, wherein respective electrical connection parts of the two power terminals are spaced apart from each other on the first side wall and the second side wall of the connecting channel, respectively.

10. The connector according to claim 9, wherein portions of the two power terminals exposed outside the housing are electrically connected to respective cables.

11. A connector, comprising:

a housing including a first side wall and a second side wall defining a connecting channel therebetween;

a plurality of power terminals arranged within the connecting channel and adapted to electrically connect with a bus bar engaged within the connecting channel;

a grounding terminal disposed on each of the first side wall and the second side wall outside the connecting channel, each grounding terminal having an elastic connecting element; and an auxiliary support member supporting the elastic connecting element.

12. The connector according to claim 11, wherein the auxiliary support member includes a first auxiliary arm located between the elastic connecting element and one of the first side wall or the second side wall.

13. The connector according to claim 12, wherein the auxiliary support member further includes a fixing part fixed to a respective one of the grounding terminals on a side thereof opposite to the connecting channel.

14. The connector according to claim 13, wherein the auxiliary support member further includes a connecting component extending from the fixing part through a gap between the elastic connecting element to the first auxiliary arm.

15. The connector according to claim 11, wherein the housing further includes two shoulders located on opposite sides of the connecting channel, respectively, one of the shoulders extending from the first side wall away from the connecting channel, and the other one of the shoulders extending from the second side wall away from the connecting channel.

16. The connector according to claim 3, wherein each of the grounding terminals further includes:

two fixing elements fixed to a respective one of the shoulders; and a second elastic connecting element located between the two fixing elements and extending obliquely outside of a plane defined by the two fixing elements.

17. The connector according to claim 16, wherein each of the grounding terminals further includes two first plug-in parts protruding from a respective one of the fixing elements for plugging into the respective shoulder.

18. The connector according to claim 17, wherein each of the grounding terminals further includes a second plug-in part located between and protruding from between bases of two second elastic connecting elements for plugging into the corresponding shoulder.

19. The connector according to claim 18, wherein each of the grounding terminals further includes a second auxiliary arm connected between the two fixing elements and located between the respective shoulder and the two second elastic connecting elements, the second auxiliary arm projecting curvedly towards the two second elastic connecting element.

20. The connector according to claim 16, further comprising a mating plate, including a main body fixed to the two shoulders, the two fixing elements and the two second elastic connecting elements of each of the grounding terminals clamped between the shoulders and the main body.

* * * * *